(12) United States Patent
Weppelmann

(10) Patent No.: US 9,517,517 B2
(45) Date of Patent: Dec. 13, 2016

(54) METHOD FOR GRINDING TOOTHED WORKPIECES AND APPARATUS DESIGNED THEREFOR

(71) Applicant: GLEASON-PFAUTER MASCHINENFABRIK GMBH, Ludwigsburg (DE)

(72) Inventor: Edgar Weppelmann, Asperg (DE)

(73) Assignee: Gleason-Pfauter Maschinenfabrik GmbH, Ludwigsburg (DE)

( * ) Notice: Subject to any disclaimer, the term of this patent is extended or adjusted under 35 U.S.C. 154(b) by 0 days.

(21) Appl. No.: 14/363,412

(22) PCT Filed: Nov. 15, 2012

(86) PCT No.: PCT/EP2012/004751
§ 371 (c)(1),
(2) Date: Jun. 6, 2014

(87) PCT Pub. No.: WO2013/083231
PCT Pub. Date: Jun. 13, 2013

(65) Prior Publication Data
US 2014/0308877 A1    Oct. 16, 2014

(30) Foreign Application Priority Data

Dec. 7, 2011    (DE) .......................... 10 2011 120 449

(51) Int. Cl.
*B23F 17/00*    (2006.01)
*B23F 23/12*    (2006.01)

(52) U.S. Cl.
CPC ........... *B23F 23/1225* (2013.01); *B23F 17/00* (2013.01)

(58) Field of Classification Search
CPC .............................. B23F 23/1225; B23F 17/00
(Continued)

(56) References Cited

U.S. PATENT DOCUMENTS

| 3,640,030 A | 2/1972 | Clarke et al. |
| 2011/0159787 A1 | 6/2011 | Kobialka |

FOREIGN PATENT DOCUMENTS

WO    2010/025942 A2    3/2010

OTHER PUBLICATIONS

Schriefer, Herbert, "Continuous CNC Gear Grinding", The Gleason Works, Mar. 1996, pp. 1-21. See p. 16.
(Continued)

*Primary Examiner* — Robert Rose
(74) *Attorney, Agent, or Firm* — Robert L. McDowell

(57) ABSTRACT

The invention concerns a method of grinding a toothed workpiece in which a central axis of the toothed contour profile is defined, wherein the method encompasses at least two work operations. In a first work operation a grinding zone of a grinding tool whose selection is determined by the grinding process to be performed, which rotates about an axis of rotation and is set up for an infeed in the direction of the shortest distance between said central axis and the rotation axis, is brought into grinding engagement with a tooth flank of the workpiece. In a later, second work operation, the tooth flank is brought into grinding engagement with a grinding zone of a grinding tool whose selection is determined by the grinding process to be performed and which is advanced in the infeed direction of the first operation. The grinding zone that is active in the first work operation is dressed in a first dressing operation with a dressing tool, and the grinding zone that is active in the second work operation is dressed in a second dressing operation with a dressing tool, wherein in the first dressing operation a first dressing tool zone is brought into dressing engagement with the grinding zone that is to be dressed, and in the second dressing operation a second dressing tool zone which is spatially separate from the first dressing tool zone (Continued)

is brought into dressing engagement with the grinding zone that is to be dressed.

9 Claims, 1 Drawing Sheet

(58) Field of Classification Search
USPC .......................... 451/5, 8, 9, 10, 47, 72, 56
See application file for complete search history.

(56) References Cited

OTHER PUBLICATIONS

International Search Report and Written Opinion for PCT/EP2012/004751 dated Jun. 19, 2013.

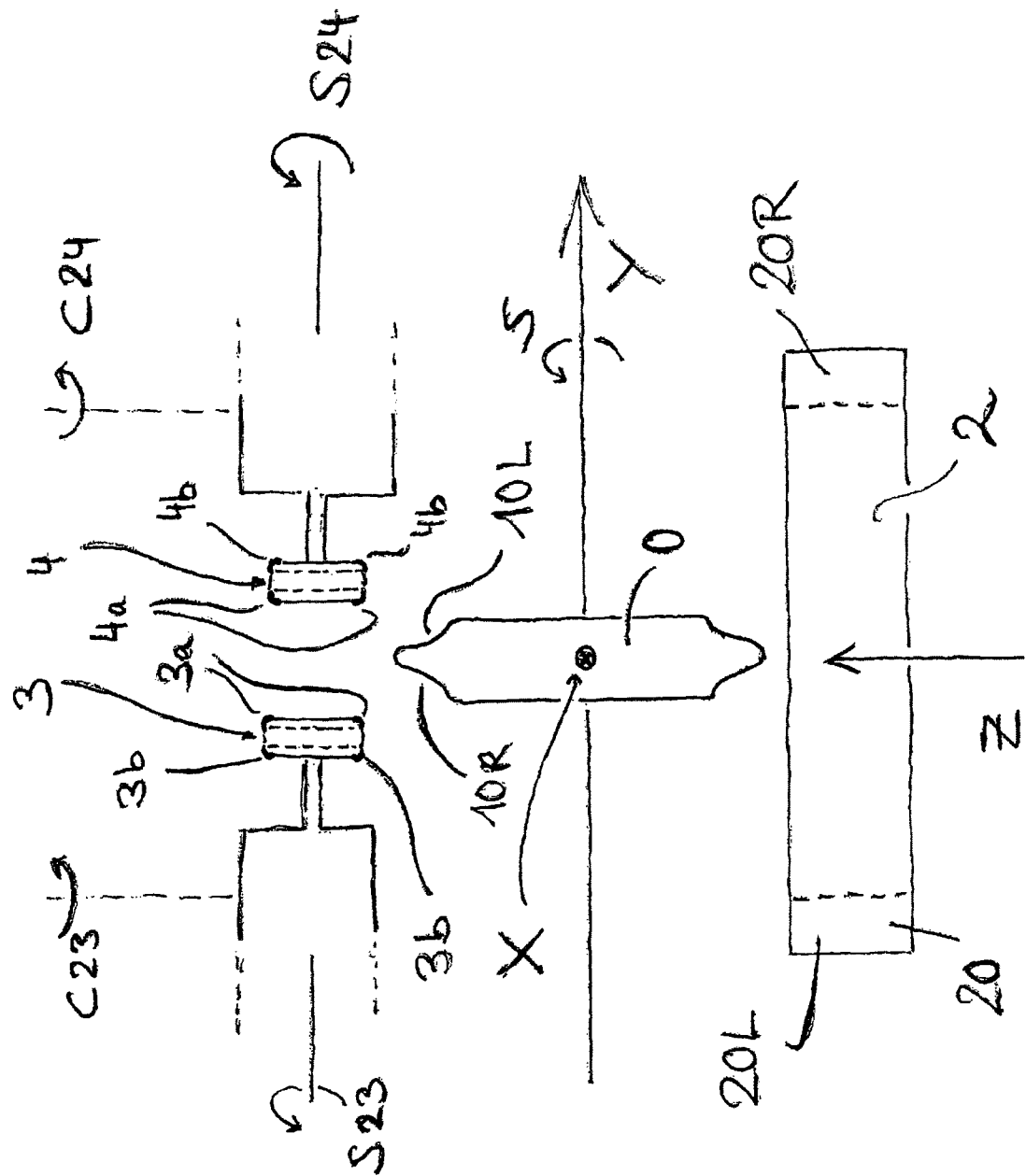

METHOD FOR GRINDING TOOTHED WORKPIECES AND APPARATUS DESIGNED THEREFOR

The invention concerns a method for the grinding of a toothed workpiece in which a central axis of the toothed contour profile is defined, said method encompassing at least two work operations, wherein in a first work operation a grinding zone of a grinding tool whose selection is determined by the grinding process to be performed, which rotates about an axis of rotation and is set up for an infeed in the direction of the shortest distance between said central axis and the rotation axis, is brought into grinding engagement with a tooth flank of the workpiece, and wherein in a later, second work operation, the tooth flank is brought into grinding engagement with a grinding zone of a grinding tool whose selection is determined by the grinding process to be performed and which is advanced in the infeed direction of the first operation, wherein the grinding zone that is active in the first work operation is dressed in a first dressing operation with a dressing tool and the grinding zone that is active in the second work operation is dressed in a second dressing operation with a dressing tool. The invention further concerns a device that is designed to perform the method.

Grinding methods of this kind belong to the known state of the art. An example to be mentioned here is the process of discontinuous profile grinding. In this process, an excess layer of material which still remains in place after the workpiece has been hardened is ground down to the final contour. At least for larger workpieces, the process is performed in more than one operating cycle, for example through several revolutions of the workpiece about its gear profile axis, wherein in each go-around one or both flanks of a tooth gap are machined, whereupon the next tooth gap is advanced to the engagement zone of the grinding tool, for example a profile-grinding wheel, until all flanks of one operating cycle have been machined.

Normally, in a grinding process that consists of two or more work cycles, different parameter settings are used for the individual work cycles, and at least a first work cycle is used for the preliminary grinding in which the profile-grinding wheel is conditioned to a comparatively rough topography of the grinding surface, resulting in a relatively high rate of material removal per unit of time. This is referred to as rough-grinding or roughing of the gear profile. As the gear tooth surface achieved at the end of the roughing work is not yet equal to the desired final contour of the gear profile, the required final surface quality of the gear profile also does not have to be attained yet. This is accomplished in a second work operation in which the rate of material removal per unit of time is comparatively small and where the grinding tool is conditioned to produce a high final quality of the resultant gear profile surface. This is referred to as finish-grinding or simply as finishing of the gear profile. It is possible to use more than one work cycle for the roughing as well as more than one work cycle for the finishing.

The aforementioned different conditioning properties of the grinding tool, for example of the profile-grinding wheel, are achieved through different procedural characteristics in the dressing of the grinding tool with a dressing tool, for example with a different contact ratio (if the profile-grinding wheel is form-dressed with a form-dressing tool). Accordingly, in the example described above, the first dressing serves to dress the grinding zone engaged in the first work cycle, using dressing characteristics appropriate for the preliminary grinding of the gear profile. In other words, the grinding tool is dressed for rough-grinding. In the second dressing, the grinding zone engaged in the second work cycle is dressed using dressing characteristics appropriate for producing the high finish quality of the gear profile of the workpiece, i.e. the grinding tool is dressed for finish-grinding.

The dressing is performed for example prior to a new grinding cycle. As soon as the quality of the gear profile machined with the grinding tool that has been dressed with the dressing tool is no longer met (even after using the margin of tolerance obtained through the choice of the setting parameters) and the deteriorated quality of the resulting gear profiles can be attributed to the dressing tool, the dressing tool is exchanged. However, already before such an exchange of dressing tools one can observe a continuous decline of the grinding results achieved with this method in regard to the final quality of the surface of the desired final contour.

According to a concept taught in DE 10 2009 048 416 B3, two machining tools can be brought into working engagement sequentially or simultaneously at different engagement sites with one gear profile or a plurality of gear profiles of a workpiece (axle shaft) by using an additional tool holder arranged for example symmetrically to a first tool holder and diametrically opposite the latter in relation to the gear profile.

A way of first rough-dressing and then fine-dressing multiple-threaded worm gears in a single dressing procedure is disclosed in DE 10 2004 020 947 B4.

Further among the present state of the art, a dressing tool is disclosed in WO 2010/025942 which can be employed for form-dressing as well as for profile-dressing, so that the dressing tool does not need to be changed when switching over from form-dressing to profile-dressing.

The invention therefore has the objective to improve a grinding method of the kind outlined above in the introductory paragraph in regard to the quality of the gear profiles produced, and in particular to lengthen the operating life of the dressing tools employed in the method.

From a process-engineering point of view, this task is solved by the invention through a further development of the aforementioned method, the inventive solution being characterized essentially by the feature that in the first dressing operation a first dressing tool zone is brought into dressing engagement with the grinding zone to be dressed and in the second dressing operation a second dressing tool zone which is spatially separate from the first dressing tool zone is brought into dressing engagement with the grinding zone to be dressed.

The invention is based on the observation that the declining final quality of the finished gear profiles is due not only to the fact that the gear profile being produced is influenced by the dressing tool indirectly by way of the grinding tool, but also that there is a reverse effect from the gear profile on the dressing tool by way of the grinding tool, which depends on the manner and frequency of the dressing operation during the grinding process. The invention is further based on the observation that this reverse effect on the dressing tool is different for different grinding procedures such as for example the aforementioned roughing and finishing. In particular, as the grinding tool is normally dressed more often for roughing than for finishing, these reverse effects are often weighted differently. Under the conventional method, all dressing operations in a grinding process participate in this reverse effect.

In contrast, with the solution according to the invention, these reverse effects are uncoupled from each other as the respective tool engagement zones used for the first and for the second dressing are spatially separated from each other. This uncoupling and the resultant reduction in wear, especially on the second dressing tool zone, causes a forward chain of effects from the dressing tool by way of the grinding tool to the gear profile which, in turn, has the result of a better quality of the gear profile in the sense of slowing down the tendency of a quality decline of the gear profile. In addition, as a bottom-line benefit a longer service life of the dressing tools is achieved. The aforementioned spatial separation of the engagement zones means that an overlap between the dressing tool engagement zones is to a large extent, in particular entirely, avoided.

As will be explained below in more detail, the grinding tool in its most elementary form can be, but does not have to be, the same for the two operations. Likewise, the dressing tool can be, but does not have to be, the same for the first and the second dressing. The only requirement is that the respective portions or zones of the dressing tool that are brought into working engagement with the grinding zone in the first dressing operation have to be different from those that are brought into working engagement with the grinding zone in the second dressing operation. As an abrasive material for the dressing tool, one could consider for example a diamond compound or a carbon boron nitride (CBN) compound.

As the infeed movement of the grinding tool that is used in the respective machining operations occurs in the same (radial) infeed direction (relative to absolute space), the grinding in both operations takes place in the same work engagement zone which, in a projection onto a plane that runs orthogonal to the axis of the gear profile, extends for example through the intersection of the center distance radius and the pitch circle of the gear profile, whose size in the direction of the center distance is determined by the whole tooth depth of the gear profile to be machined, and whose size in the direction orthogonal to the center distance is determined by the module of the gear profile and the number of tooth flanks to be machined simultaneously with the grinding tool.

As far as the grinding contact zones and the grinding tool are concerned, it can be envisioned in a particularly preferred embodiment of the invention that the respective grinding contact zones involved in the first and in the second grinding operation spatially coincide with each other. The invention can thus be realized in a particularly simple way, for example with only one profile grinding wheel, where the two grinding contact zones are now distinguished by their different grinding surface topographies that are generated, respectively, by the first and the second grinding operation. In other words, in regard to its physical location (as a tool element) there is only one grinding contact zone which in the process sequence is dressed by different work engagement zones of the dressing tool.

The grinding process could be a profile grinding process or a generating grinding process, but the method is particularly well suited for profile grinding. Furthermore, the process could be a discontinuous or a continuous process, the discontinuous process being preferred here.

With particular preference, a larger amount of material is removed from the tooth flank in the first machining operation (for example by roughing) than is removed in the second machining operation.

The second grinding operation is preferably a finishing operation. It is particularly advantageous if the operation covers the grinding of the tooth flanks to the desired final contour. It should be noted that the terms "first operation" and "second operation" do not imply any set number of go-around cycles used for grinding, roughing or finishing, but that the attributes "first" and "second" merely indicate that the grinding tool contact zone used in the first or second operation is dressed, respectively, through the first or second dressing operation with the first or second dressing tool zone.

In a particularly preferred embodiment, the grinding tool contact zones used in the two operations have grinding surface topographies different from each other, in particular a rougher surface in the first operation than in the second operation. In this way, the separation of the process into at least one roughing operation and at least one finishing operation can be used more efficiently.

As an alternative and/or in addition, at least one parameter setting can differ between the first and second operations.

This also allows the grinding parameters to be selected so that they are appropriate on the one hand specifically for the roughing and on the other hand for the finishing.

For the dressing, it is on the one hand possible to use the technique of form dressing where the dressing tool is moved along the grinding tool contact zone in accordance with a predetermined (NC-controlled) course of movement, or to use the technique of profile dressing where the dressing tool is shaped in accordance with the desired geometry of the grinding tool. Form dressing is the preferred technique for both dressing operations.

In principle, a beneficial effect of the invention can be achieved solely through the spatial separation of the two dressing tool zones from each other, even if they have the same dressing properties. A further improvement and a more advantageous use of the flexibility afforded by the invention can be achieved if the two dressing tool zones have dressing properties different from each other, for example in regard to the hard material of the surface layer, the shape and position of the grains, grain pattern, grain distance, alignment, hardness, or production process of the material. The first dressing contact zone can for example contain longer polycrystalline diamond (PCD) rods than the second dressing contact zone. Thus, the first dressing contact zone can be optimized in its dressing properties specifically for rough-dressing, while the second dressing contact zone can be optimized for finish-dressing. Natural diamonds could be used for the rough-dressing tools and CVD (carbon vapor deposition) diamond grains for the finishing tools. In the production of the dressing tool, one is no longer forced to compromise in order to achieve an at least satisfactory performance in both rough-dressing as well as finish-dressing.

Also, in the case of form-dressing with form-dressing tools, the first and the second dressing contact zone can have different radii. It is advantageous in this case if the radius of the second dressing contact zoned is selected larger than the radius of the first dressing zone. Besides the shape of the dressing zone, the diameter of the dressing tool can also be selected differently.

With particular preference, the dressing with the first dressing zone in comparison to the dressing with the second dressing zone is performed with a different value of at least one dressing parameter. For example, a normal contact ratio may be selected in the second dressing which lies in a range between 5 and 7 and which can be approximately twice as large as the normal contact ratio in the first dressing which may lie for example in the range from 2 to 4.

Further, the infeed speed could be different between the two dressing operations, preferably larger for the first dressing than for the second dressing. Also, different speed ratios ($q_d$) could be set for the two dressing operations. For crush-dressing, the speeds are equal.

It is considered particularly advantageous if the dressing tool for the first and/or the second dressing is configured as a roller, specifically a diamond-coated roller. The process of making such diamond-coated rollers belongs to the known state of the art as described for example in Thomas Bausch, "Innovative Zahnradfertigung" (Innovative gear-manufacturing), Expert Verlag, $3^{rd}$ Edition.

In one embodiment, the first and the second dressing zone can be arranged (at least partially) on the same dressing tool, which can be in particular of a subdivided configuration. With this arrangement it can be advantageous if, in order to change from the first to the second dressing or vice versa, the dressing tool is swiveled by 180° about a swivel axis that runs orthogonal to the axis of rotation of the dressing tool. The purpose for this is in particular to allow different dressing zones on the same dressing tool to be positioned ready for engagement.

In one of its embodiments, the invention can be realized with only one dressing tool which carries the two dressing contact zones in separate locations.

However, a particularly preferred variant of the invention is equipped with at least two dressing tools which are in particular of a divided configuration. Conceivably in this arrangement, each of the dressing tools can carry a part of the first and a part of the second dressing zone. In at least one of the dressing operations, this opens the way that all of the grinding zones required for the grinding of left- and right-hand flanks of the gear profile can be dressed in parallel at the same time. However, it is also possible that the first dressing zone is arranged on a first dressing tool and the second dressing zone on a second dressing tool. This facilitates the fabrication of the required dressing tools in particular when dressing zones with different dressing properties are employed.

An alternative embodiment could in principle also have two grinding tools. For example, a first grinding tool could carry the grinding contact zone used in the first work operation and a second grinding tool could carry the grinding contact zone used in the second work operation. Based on the invention, because in this case the first grinding tool is dressed in the first dressing operation and the second grinding tool is dressed in the second dressing operation, one grinding tool can for example be designed as a tool that is optimized for roughing alone, without having to be concerned about reciprocal effects on the dressing zone that is reserved for the dressing of the finishing tool. The second tool can be optimized as a pure finishing tool, without the need to search for a satisfactory compromise between two grinding contact zones arranged on the same grinding tool.

In principle, it is possible to use for example a disk-shaped grinding tool for both work operations, or also to use a worm-shaped tool in both work operations. The preferred choice is to use the disk-shaped grinding tool.

If two tools are used, it is possible to arrange them for example on the same tool spindle. However, one could also choose an arrangement with a tool changer.

As already mentioned above, a work operation can encompass the grinding of all left-hand flanks or of all right-hand flanks of the gear teeth of the workpiece.

The decision of when and how often to perform the first dressing operation depends on the grinding process, in particular on the size of the gear profile to be produced. It may be necessary to dress the grinding tool even during a single go-around. It can be advantageous to perform the first dressing in the first work operation and/or the second dressing in the second work operation of an individual work piece (or of every work piece of a batch).

Of particular interest is the possibility that prior to grinding with the second grinding zone, a work operation covering more than one go-around of the workpiece can be completed with the first grinding zone, and also in particular that several work operations can be performed with the second grinding zone. The terms "first grinding zone" and "second grinding zone" in this context are meant, respectively, as the zones that are used in the "first" and "second" work operation. Or, if a work operation is equated to one go-around, it means that several first work operations and also several second work operations can be performed.

Patent protection for the invention also extends to a program for the control of a machine tool on which control commands for the execution of a method according to one or more of the foregoing aspects are implemented.

From a device-oriented point of view, the invention provides a device for the grinding of a workpiece with a gear-tooth profile. The device, which includes a workpiece holder to hold the work piece and a grinding system with at least one tool spindle for at least one grinding tool which can be driven by a rotary drive source, is designed to bring the grinding tool, while the latter is spinning about its rotary axis, into grinding engagement with a tooth flank of the gear profile. Further included are a dressing arrangement with at least one dressing tool that can be brought into working engagement for the dressing of the at least one grinding tool, and a controller device. The at least one dressing tool is configured with a first and a second dressing engagement zone arranged in spatial separation from each other. The controller device is designed with the capability of controlling the grinding device to perform a grinding process according to a method with one or more of the aforementioned method-oriented features.

The advantages of the device correspond to the aforementioned advantages of the method.

The device can further include a dressing spindle carrying at least one dressing tool, wherein the dressing spindle can be swiveled 180° about an axis that runs orthogonal to the dressing spindle axis.

Further characteristic features, details and advantages of the invention will become apparent from the following description of individual embodiments of the invention based on the drawing.

The drawing, which contains only FIG. 1, shows a partial view of a first embodiment of the invention in side elevation.

The workpiece 2 which is schematically outlined in the drawing has an external gear profile 20 and is arranged on a support table (not shown) of a machine tool, with the gear axis z oriented against the direction of gravity. A left tooth flank 20L and a right tooth flank 20R are indicated schematically. With a rotation C of the table by about 90°, the tooth flank 20L will be brought into a position where it can be brought into grinding contact with the grinding tool, configured as a profile disk 0 in the illustrated embodiment, after the latter has been lowered in the z-direction and advanced in the radial infeed direction x.

In this example the method is applied to a process of discontinuous profile grinding with the profile-grinding wheel 0. The profile-grinding wheel 0 operates in a two-flank process, wherein the grinding zone 10L (facing to the right in the representation of the drawing) grinds the left flanks 20L of the gear profile 20 and the grinding zone 10R (facing to the left in the representation of the drawing) grinds the right flanks 20R of the gear profile 20.

Further, the grinding of the workpiece 2 is performed over n revolutions (go-arounds), in this case for example four revolutions, of the work piece 2, wherein in each revolution every tooth flank 20L, 20R of the gear profile 20 is subjected to at least one pass of the grinding wheel, whereby a remaining layer of material above the desired final contour is successively reduced. The first three revolutions are used for rough-grinding the tooth flanks 20L, 20R. The rough-grinding serves to remove material at a fast rate, and the profile disk 0 is accordingly dressed for roughing.

This dressing (herein referred to as first dressing), which can be performed for example in connection with each individual go-around of the roughing operation, is performed with dressing tools in the form of diamond-coated form rollers 3, 4. In this process, the form roller 4 moves over the profile-grinding wheel 0 in a controlled path while the profile wheel 0 is turning about its rotary axis S and the form roller 4 is simultaneously turning about the dressing tool axis S24, whereby the desired conditioning of the grinding zone 10L of the profile-grinding wheel 0 is achieved. The part of the form roller 4 that comes into working contact with the grinding zone 10L in this rough-dressing operation is the dressing zone 4a of the form roller 4 which is shaped with a radius $R_a$ and is located (in the drawing) to the left of the median plane of the form roller 4.

Analogously, the grinding zone 10R of the profile-grinding wheel 0 which is used to grind the right-hand tooth flanks 20R is dressed by the dressing zone 3a of the form roller 3 which is located on the opposite side of the center plane of the two rollers 3, 4 and turns about the rotary axis S23. Accordingly, the two zones 4a, 3a together form the first dressing zone, i.e. the zone used for the first dressing operation.

Although two dressing form rollers 3, 4 are shown in this example for the dressing of the two sides 10L, 10R, it would also be conceivable to leave out the second form roller 3, using instead an arrangement where the form roller 4 is first swiveled 180° about a swivel axis C24 which runs perpendicular to the dressing tool axis S24 and then shifted to the left (relative to the viewing direction of the drawing) of the profile-grinding wheel 0, in order to dress the profile-grinding wheel 0 also in the grinding zone 10R which grinds the right tooth flanks 20R.

Up to this point of the description, there is no principal difference in the grinding process in comparison to state-of-the-art methods.

For the finishing revolution of the work piece 2 the grinding zones 10L and 10R are dressed for finish-grinding by setting the dressing parameters appropriately for finishing work. However, the dressing tool zones 4a of the form roller 4 and 3a of the form roller 3 are not used again in this operation. Instead, different dressing tool zones 4b, 3b, which are arranged at respectively different locations of the form rollers 4 and 3, are brought into form-dressing engagement with the grinding zones 10L and 10R, respectively.

To move the form roller 4 into position, so that the dressing zone 4b can move into engagement with the grinding zone 10R of the profile-grinding wheel 0 along the programmed path for the form dressing, the form roller 4 is moved relative to the profile-grinding wheel along linear displacement paths parallel to the tool spindle axis Y and the gear profile axis Z, so that the median plane of the form roller 4 is shifted (in reference to the situation shown in the drawing) to the opposite side of the median plane of the profile-grinding wheel. Analogously, the dressing zone 3b of the form roller 3, which occupies a location separate from the dressing zone 3a, can be brought into dressing engagement with the grinding zone 10L for the form dressing of the grinding zone 10L. The configuration and dimensions of the grinding tool, dressing tools and dressing spindles in this arrangement are appropriately selected for these movements to take place unimpeded, even though this may not be entirely apparent from the schematic illustration of FIG. 1.

Thus, the wear on the dressing tool which occurs in the rough-dressing (first dressing operation) affects only the dressing zones 4a, 3a, but has no effect on the dressing zones 4b, 3b which are reserved for the finish-dressing. The finish-dressing zones 4b, 3b (second dressing zones) are thus subjected to less wear and will therefore better maintain their ability to achieve a desired grinding surface topology for finish-grinding in subsequent finish-dressing operations, so that the end product quality after the last grinding pass (finish-grinding) will also be improved in subsequent workpieces of the same batch. This has a beneficial effect on the service life of the second dressing zone.

Instead of the arrangement shown in the drawing, one could also use other configurations. As already mentioned, a solution without the second form roller 3 is possible, as the form roller 4 with its capabilities for linear position-shifts and a 180° swivel movement about the axis C24 can be used not only for the first dressing (roughing) of the grinding zones 10L, 10R as described above, but the spatially separate dressing zone 4b of the same form roller 4 can also perform the second dressing (finish-dressing) of the two grinding zones 10L and 10R.

In yet another embodiment, each of the form rollers 3, 4 could also be split up into two parts, or the form rollers 3, 4 could be arranged on a common spindle axis S2 (not shown in the drawing). In the latter case, the intersection of the rotary axis S2 of the dressing tool with a swivel axis C2 (not shown in the drawing) could also lie between the two form rollers 3 and 4.

The dressing properties of the dressing tool zones 4a, 3a are in this case identical to those of the zones 4b, 3b. However it would also be possible to intentionally select different dressing properties. The radius $R_b$ of the zones 4b, 3b can for example be larger than $R_a$.

Further, in the present example only one tool in the form of a profile grinding wheel 0 is used for the first and second work operations (all of the roughing and finishing turns). However, it is also conceivable to arrange on the spindle axis Y a roughing disk dedicated specifically to the rough-grinding operation and a finishing disk dedicated specifically to the finishing operation. The different possible configurations of the dressing arrangement described above can likewise be employed in connection with two grinding tools.

The foregoing example is based on the dual-flank grinding process. However, it is also possible to use separate grinding tools and to perform the grinding in the single-flank grinding process. The basic principle, i.e. to use two spatially separated dressing zones to dress the grinding tool for two operations that have different purposes, remains unchanged.

In a further embodiment one could also use a worm-shaped tool for example for continuous generation-grinding, wherein the grinding zones are dressed for roughing in the first work operation and for finishing in the second work operation. In this case, the dressing tool 4 or the dressing tools 4 and 3 would not be designed for form-dressing but rather for profile dressing, again with spatially separate dressing zones for the first and the second dressing operation. Here also, one could use a rough-grinding worm and a finish-grinding worm.

The use of two grinding tools in the form of two profile disks or also in the form of two generation grinding worms can again be realized either by shifting the tool on a common spindle axis or through a tool change.

Thus, the invention is not limited to the example shown in the drawing. Rather, the features disclosed in the description and in the claims, whether used individually or in combination, can be considered as essential parts in realizing the invention in its different embodiments.

The invention claimed is:

1. Method of grinding a tooth-profiled workpiece (2) having a central axis (Z) of the toothed profile, said method comprising at least two work operations, wherein in a first work operation a grinding zone (10L, 10R) of a profile grinding tool (0) whose selection is determined by the grinding process to be performed, which rotates about an axis of rotation (y) and is set up for an infeed in the direction (X) of the shortest distance between said central axis (Z) and the rotary axis (Y), is brought into grinding engagement with a tooth flank (20L, 20R) of the workpiece (2), and wherein in a later, second work operation the tooth flank (20L, 20R) is brought into grinding engagement with a grinding zone (10L, 10R) of said profile grinding tool (0) whose selection is determined by the grinding process to be performed and which is advanced in the infeed direction of the first work operation, wherein the grinding zone (10L, 10R) that is active in the first work operation is dressed in a first dressing operation with a form rolling dressing tool (4, 3) and the grinding zone that is active in the second work operation is dressed in a second dressing operation with the same form rolling dressing tool (4, 3) utilized in said first dressing operation, characterized in that in the first dressing operation a first form rolling dressing tool zone (4a, 3a) is brought into dressing engagement with the grinding zone (10L, 10R) that is to be dressed, and in the second dressing operation a second form rolling dressing tool zone (4b, 3b) which is spatially separate from the first form rolling dressing tool zone (4a, 3a) is brought into dressing engagement with the grinding zone (10L, 10R) that is to be dressed.

2. Method according to claim 1, wherein the grinding zone involved in the first work operation and the grinding zone involved in the second work operation spatially coincide with each other.

3. Method according to claim 1 wherein more material per unit of time is removed from the tooth flank in the first work operation than is removed in the second work operation, and wherein the first work operation comprises rough grinding.

4. Method according to claim 1 wherein in the second work operation the tooth flank is ground to a desired final contour, and wherein the second work operation comprises finish-grinding.

5. Method according to claim 1 wherein the two dressing zones have dressing properties different from each other.

6. Method according to claim 1 wherein the first dressing takes place in the first work operation.

7. Device for the grinding of a toothed workpiece, comprising a workpiece holder to hold the work piece, a grinding arrangement with at least one tool spindle carrying at least one grinding tool which can be driven by a rotary drive source and which is designed to bring the grinding tool, while the latter is spinning about its rotary axis, into grinding engagement with a tooth flank of the toothed profile, further comprising a dressing arrangement with at least one dressing tool that can be brought into working engagement for the dressing of the at least one grinding tool, and also comprising a controller device, characterized in that each of said at least one dressing tool is configured with a first and a second dressing engagement zone arranged in spatial separation from each other, and that the controller device is equipped with an operating program with the capability of controlling the device for the grinding of the toothed profile of the work piece under a method according to claim 1, wherein the device comprises only one profile grinding tool (0).

8. Method according to claim 1 wherein the two dressing zones have radii different from each other.

9. Method according to claim 1 wherein the second dressing takes place in the second work operation.

* * * * *